United States Patent [19]
Hjelden

[11] Patent Number: 6,009,786
[45] Date of Patent: Jan. 4, 2000

[54] UNIFORM BAR AND CAKE CUTTER

[76] Inventor: Rodney Allen Hjelden, 116 3rd. Ave. NW, Box 27, Surrey, N. Dak. 58785

[21] Appl. No.: 08/774,352

[22] Filed: Dec. 27, 1996

[51] Int. Cl.[7] ..................................................... B26D 5/08
[52] U.S. Cl. ................................ 83/620; 30/114; 30/287; 30/294; 30/305; 30/315; 99/537; 83/932
[58] Field of Search .............................. 30/114, 304, 305, 30/312, 315, 287, 289, 294; 83/932, 648, 614, 620; 99/537, 543, 544, 545

[56] References Cited

U.S. PATENT DOCUMENTS

| | | | |
|---|---|---|---|
| 570,870 | 11/1896 | Davidson | 425/312 X |
| 1,128,479 | 2/1915 | McPherson | 30/304 |
| 1,339,436 | 5/1920 | Conrad | 30/304 |
| 1,342,383 | 6/1920 | Horvath | 30/304 |
| 1,424,389 | 8/1922 | Wyatt | 30/304 |
| 1,463,941 | 8/1923 | Cusimano | 30/312 X |
| 1,530,796 | 3/1925 | Thomsen | 30/304 X |
| 1,565,846 | 12/1925 | Cantey | 83/620 X |
| 1,805,411 | 5/1931 | Monterio | 30/304 |
| 2,084,570 | 6/1937 | Beck | 30/304 |
| 2,254,759 | 9/1941 | Stainbrook | 426/503 X |
| 2,396,443 | 3/1946 | Singer | 30/304 |
| 2,557,539 | 6/1951 | Henrickson | 30/304 X |
| 2,560,229 | 7/1951 | Leavens | 99/537 X |
| 2,619,051 | 11/1952 | Rice | 426/503 X |
| 2,986,815 | 6/1961 | Fernald et al. | 30/304 |
| 3,302,591 | 2/1967 | Schmidt | 426/503 X |
| 3,545,325 | 12/1970 | Camasta | 30/304 X |
| 3,593,611 | 7/1971 | Sagehorn | 83/620 X |
| 3,776,075 | 12/1973 | Matthews | 83/110 |
| 4,072,075 | 2/1978 | Ezaki | 30/114 X |
| 4,085,504 | 4/1978 | Nagy | 30/123 |
| 4,436,025 | 3/1984 | Jones | 99/537 X |
| 4,569,280 | 2/1986 | D'Ambro et al. | 99/537 X |
| 5,129,159 | 7/1992 | Fuenzalida | 30/114 |
| 5,142,973 | 9/1992 | Tur et al. | 99/537 X |
| 5,343,623 | 9/1994 | Cole et al. | 30/304 |
| 5,388,489 | 2/1995 | Dayley | 83/117 |
| 5,463,943 | 11/1995 | Knasel | 99/544 X |
| 5,533,269 | 7/1996 | Pickens et al. | 30/304 |

FOREIGN PATENT DOCUMENTS

| | | | |
|---|---|---|---|
| 1090652 | 4/1955 | France | 30/114 |
| 3147112 | 12/1982 | Germany | 30/114 |
| WO 92/20270 | 11/1992 | WIPO | 30/114 |

*Primary Examiner*—M. Rachuba
*Attorney, Agent, or Firm*—Curtis V. Harr

[57] ABSTRACT

A method and apparatus for quickly and easily cutting straight and uniform dessert bars is provided. The baker's cutting device consists of two parallel blocks connected perpendicularly by two parallel guide bars. The bottom of the front block is configured such that the block fits over one edge of the baking pan and the back edge of the block hangs over the edge of a table or counter top to hold the apparatus in place. The guide bars are in this manner suspended just over the top of a typical baking pan. Resting perpendicularly upon the guide bars is a sliding cutting bar, this cutting bar may be supplied with handles at each end. A plurality of cutting blades are attached to both the upper and lower sides of the cutting bar at various intervals.

9 Claims, 5 Drawing Sheets

UNIFORM BAR AND CAKE CUTTER

BACKGROUND OF THE INVENTION

The present invention relates to an improvement in the manner in which dessert items can be cut after being cooked in a sheet-like form. More specifically, the manner in which pans or sheets of brownies or other confections can be cut so that the individual servings of the dessert are divided into equal portions of uniform size and form with straight, finished edges.

Desserts such as brownies or bars are traditionally baked in a flat pan with short sides, such that the finished product reaches a height of approximately one inch. In the past, when serving the bars, the cook was required to use a knife or similar device to cut the bars into individual servings in order to remove them from the pan. This method frequently results in bars of unequal size, with slanted or crooked edges unsuitable for presentation. Additionally, meticulously cutting the bars by hand is a time consuming and frustrating process.

Similarly, professional bakers often bake brownies and desserts for sale in coffee shops and restaurants, or bake sheet-type cakes for weddings and other special occasions. It is very important to these businesses that the final product be neat and uniform in size, but also that the process by which the product is cut is quick and easy.

One prior solution by Moline has been a long double bar having knifes projecting from both sides in rows. This device is pulled through the cake or brownies, towards the user, in a sometimes dangerous manor. This can also be rather cumbersome as the user must hold the pan and guide a device that requires two hands. Finally this device is guided by hand, thus, the cuts may not be straight if the user is unskilled.

From the foregoing discussion it can be seen that it would be desirable to provide of method of cutting brownies, bars and cakes that produces a uniform size and straight, even edges. Also, it would be highly desirable to provide a device that is quick, easy and safe to use. Additionally, desserts are baked in many different kinds of pans, varying in both size and dimension. It would be desirable to provide a cutting device that can easily be adjusted to accommodate these varying sizes.

SUMMARY OF THE INVENTION

It is the primary objective of the present invention to provide a means by which brownies, bars and sheet cakes can be cut into individual serving sizes which are uniform in size and have straight, even edges.

It is an additional objective of the present invention to provide a cutting method that is simple and quick.

It is still a further objective of the present invention to provide a device which is easily adjustable to accommodate varying sizes of baking pans.

These objectives are accomplished by the use of a device consisting of two parallel blocks connected perpendicularly by two parallel guide bars. The bottom of the front block is configured such that the block fits over one edge of the baking pan and the back edge of the block hangs over the edge of a table or counter top to hold the apparatus in place. The guide bars are in this manner suspended just over the top of a typical baking pan.

Resting perpendicularly upon the guide bars is a sliding cutting bar. This cutting bar may be supplied with handles at each end. A plurality of cutting blades are attached to both the upper and lower sides of the cutting bar at various intervals. These blades may be formed from metal or a suitable hardened plastic. The baking pan is secured under the front block and the cutting bar and the plurality of cutting blades is forced into the baking pan, thereby beginning the cutting operation. By pushing the cutting bar, the user then forces the plurality of cutting blades down one length of the confection and away from the user. The pan is then rotated 90 degrees and the operation may be repeated down the other length, the cutting operation is completed resulting in perfectly straight and uniform dessert bars.

The cutting bar may be supplied with cutting blades spaced at different intervals on either side. By suppling different spacings for the cutting bar, different sizes of pans and finished bars may easily be accommodated depending on the users tastes or needs.

For a better understanding of the present invention reference should be made to the drawings and the description in which there are illustrated and described preferred embodiments of the present invention.

DESCRIPTION OF THE PREFERRED EMBODIMENT

Figure 1:
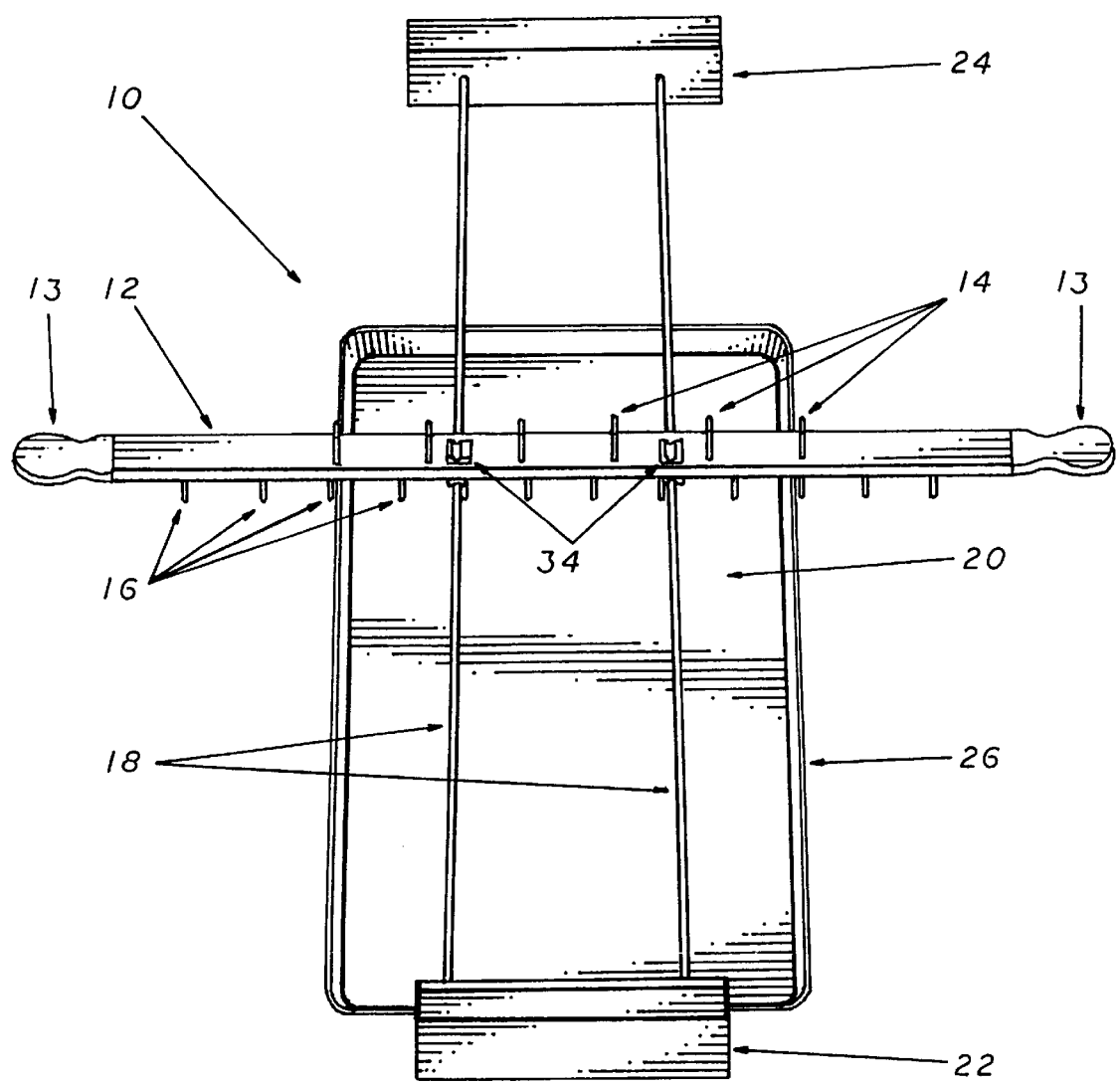
FIG. 1 is a perspective view of the Uniform Bar and Cake Cutter showing the orientation of its major components when used in conjunction with a typical baking pan.
Figure 2:
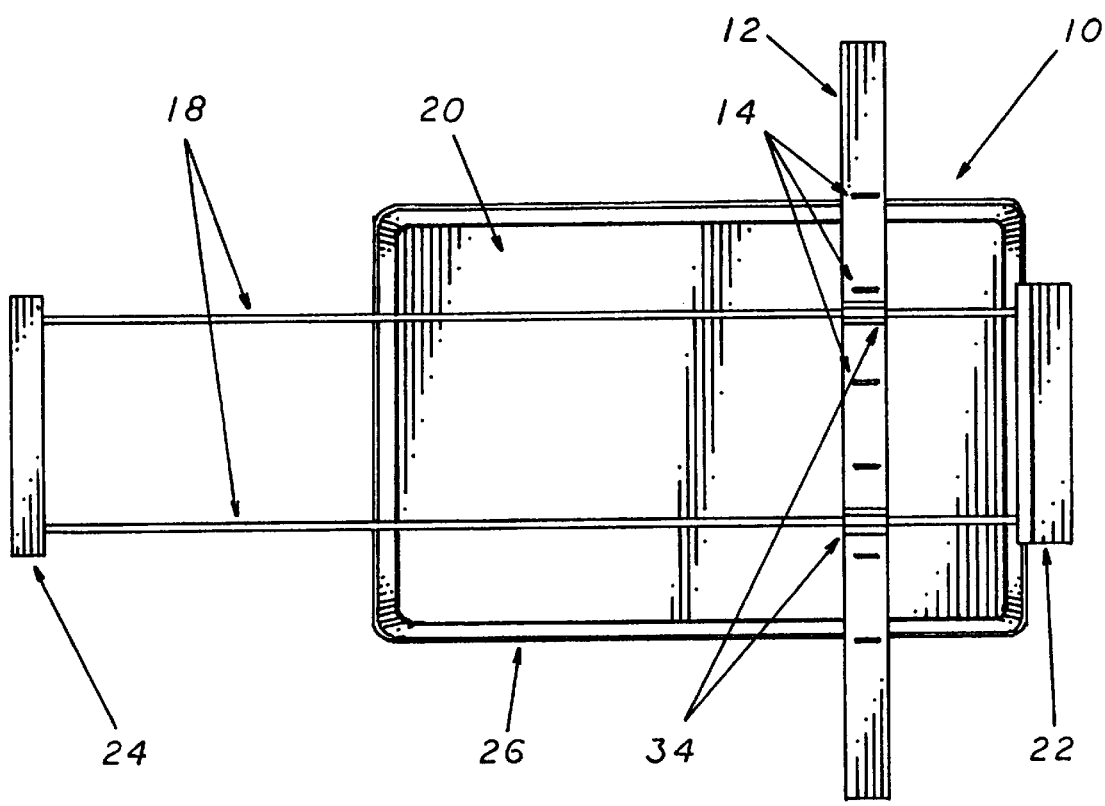
FIG. 2 is a top elevation view of the present invention again showing the orientation of its major components when used in conjunction with a typical baking pan.

Referring now to the drawings, and more specifically to FIGS. 1 and 2, the Uniform Bar and Cake Cutter 10 comprises a cutting blade bar 12 with handles 13 at each end. The cutting blade bar 12 is suspended over a baking pan 20 on the guide bars 18. The guide bars 18 are in turn suspended in a parallel manner between the front guide bar/pan hold down block 22 and the rear guide bar block 24. The cutting blade bar 12 has a total of four guide bar runners 34, having two located on both the upper and lower surfaces of the cutting blade bar 12 which coincide in location with the guide bars 18. These guide bar runners 34 are equipped with hemispherical notches into which the guide bars 18 fit. This configuration allows the cutting blade bar 12 to move freely along the length of the guide bars 18.

The cutting blade bar 12 has attached to its flat surfaces the width cutting blades 14 and the length cutting blades 16 one of which extends down into the cavity of a baking pan 20. The spacing between the individual cutting blades is narrower in the width cutting blades 14 and wider in the length cutting blades 16. Thus, a user may form rectangular dessert bars by making one cut using the length cutting blades 16 and then flipping the cutting blade bar 12 over and performing a second cut with the width cutting blades 14 in a perpendicular manner to that of the first cut.

Figure 3:
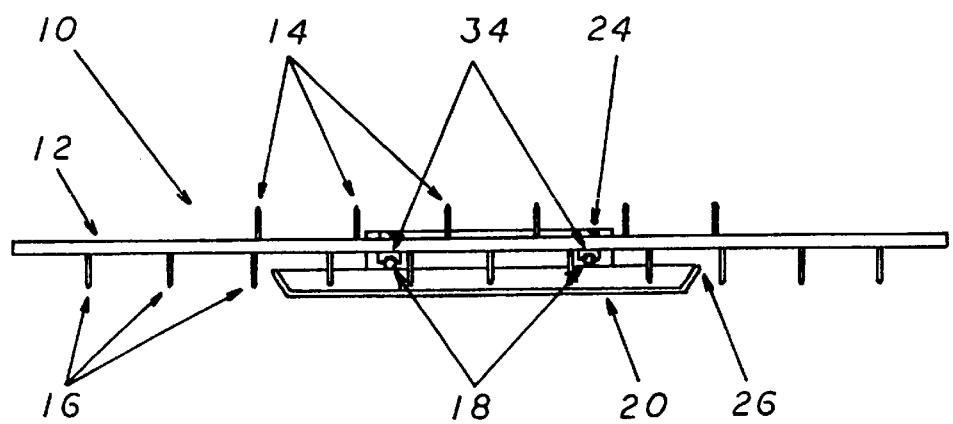
FIG. 3 is a front elevation view of the present invention showing the manner in which the cutting knifes extend downward into a typical baking pan in order to perform the bar cutting operation.
Figure 4:
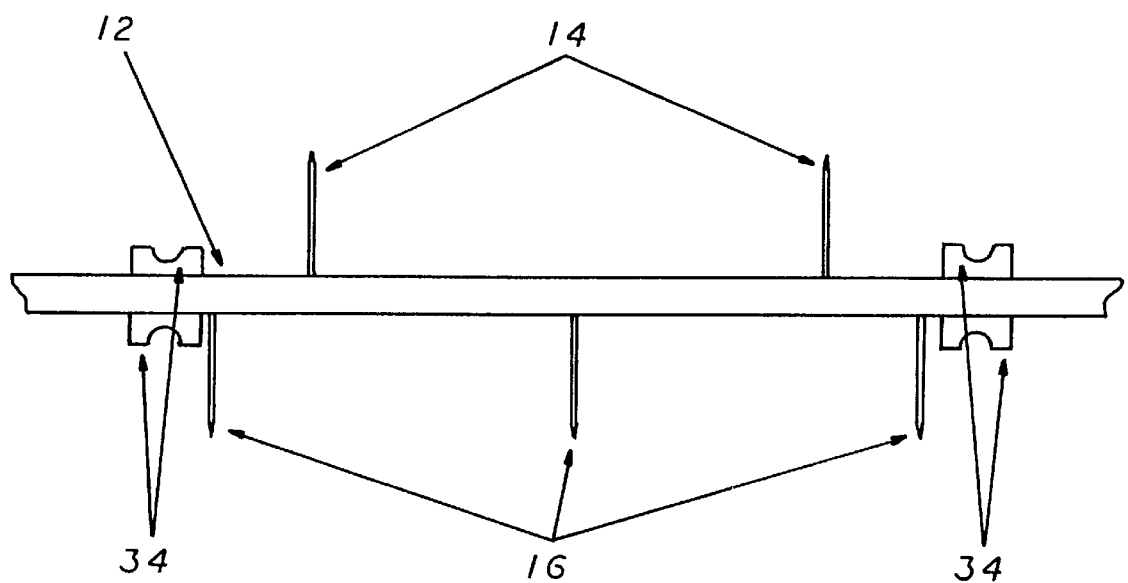
FIG. 4 is an exploded front elevation view of the cutting bar portion of the present invention detailing the manner of construction of the length and width cutting knifes and the guide bar runners.

FIGS. 3 and 4 depict and detail the construction of the width and length cutting blades, 14 and 16, the manner in which they extend into the baking pan 20 below the baking pan edge 26, and the location and form of the guide bar runners 34. The cutting blade bar 12 rests on the guide bars 18 and is thereby suspended over the baking pan 20. Then, depending upon the width of the cut desired, either the width or length cutting blades, 14 and 16, are placed in the downward position and, thus, extend into the baking pan 20.

The four guide bar runners 34 are located in pairs on each upper and lower surfaces of the cutting blade bar 12. Each guide bar runner 34 is equipped with a hemispherical notch that exactly matches the position of the two guide bars 18 and serves to engage and secure the cutting blade bar 12 in the proper position over the baking pan 20. The guide bar runners 34 also allow for the free movement of the cutting blade bar 12 along the length of the guide bars 18. This allows the width or length cutting blades, 14 and 16, to pass through the length or width of the baking pan 20 and, thereby, perform the desired cutting operation.

Figure 5:
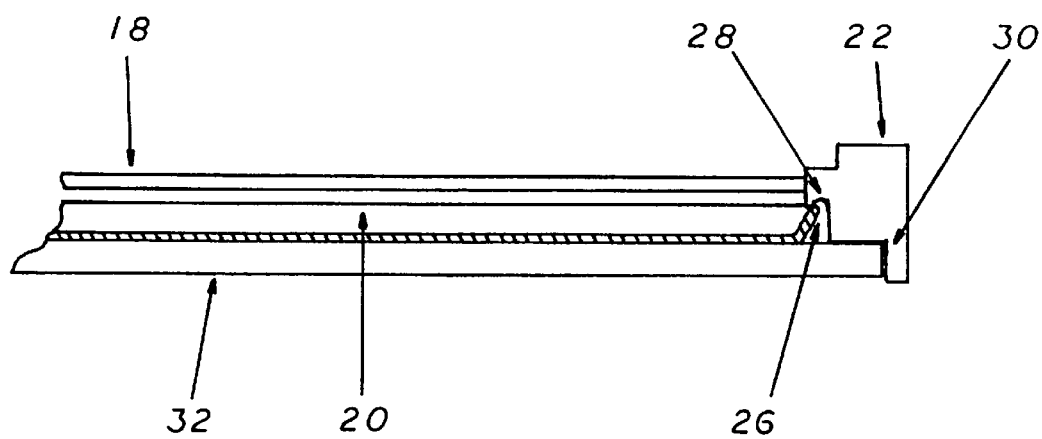
FIG. 5 is a side elevation cut-away view of the present invention showing the manner in which the it fits against a typical table top and also how it holds the edge of a typical baking pan.

The manner in which the front guide bar/pan hold down block 22 engages the pan edge 26 and the table top 32 is shown by FIG. 5. The front guide bar/pan hold down block 22 has at its rear lower corner a table edge notch 30 which is basically a lip that extends downward over the table top 32. This feature allows the present invention to be held securely on the table top 32 while the cutting operation is performed. The front guide bar/pan hold down block 22 also has at is forward end a downward facing pan edge notch 28 which locks over the baking pan edge 26 during operation. Thus, when down force is placed on the front guide bar/pan hold down block 22, the pan edge notch 28 holds the baking pan 20 in place and facilitates the easier operation of the present invention during the dessert bar cutting operation.

Figure 6:
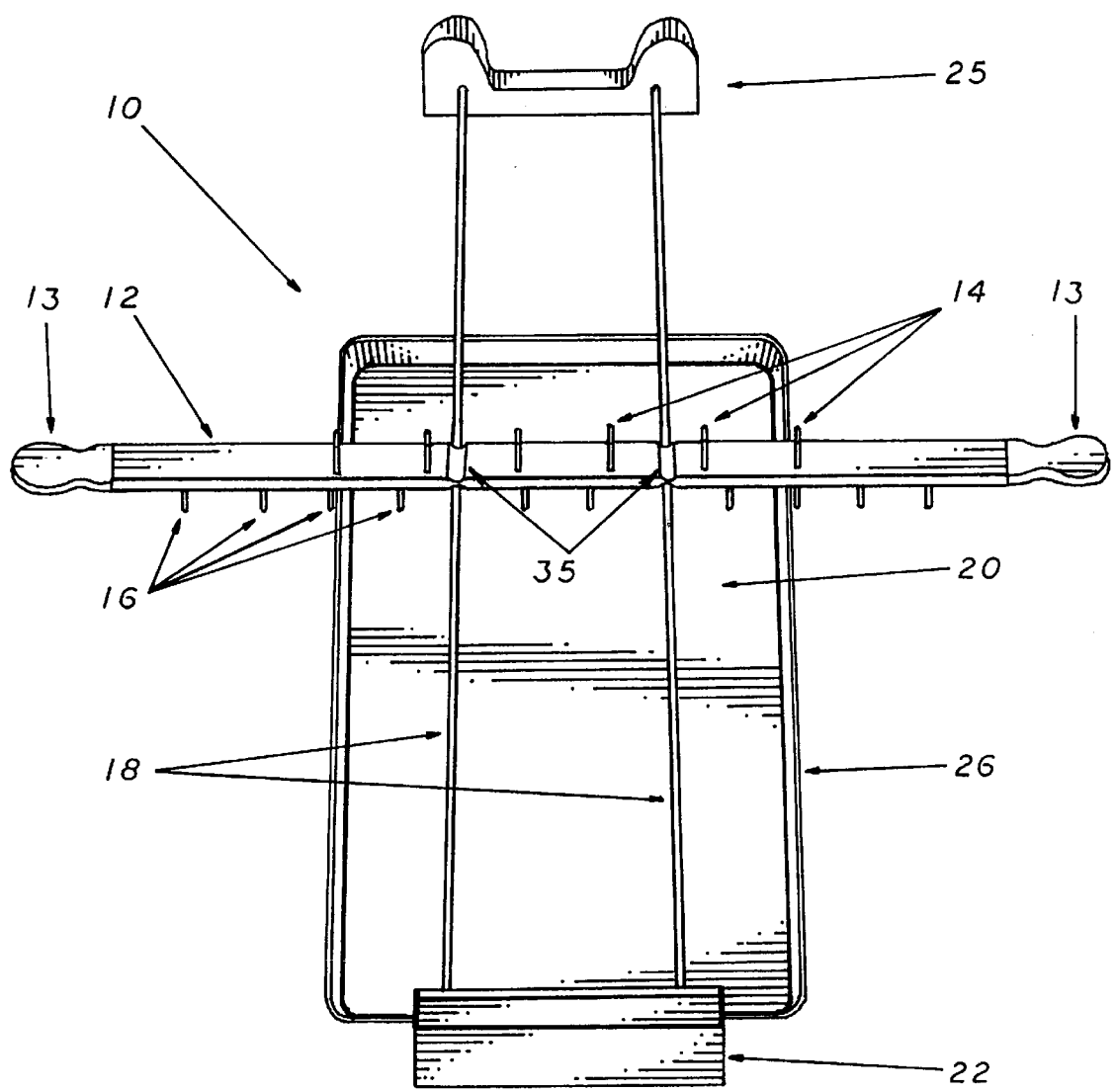
FIG. 6 is a perspective view of an alternative embodiment of the Uniform Bar and Cake Cutter showing the orientation of its major components with modified guide bar supports.
Figure 7:
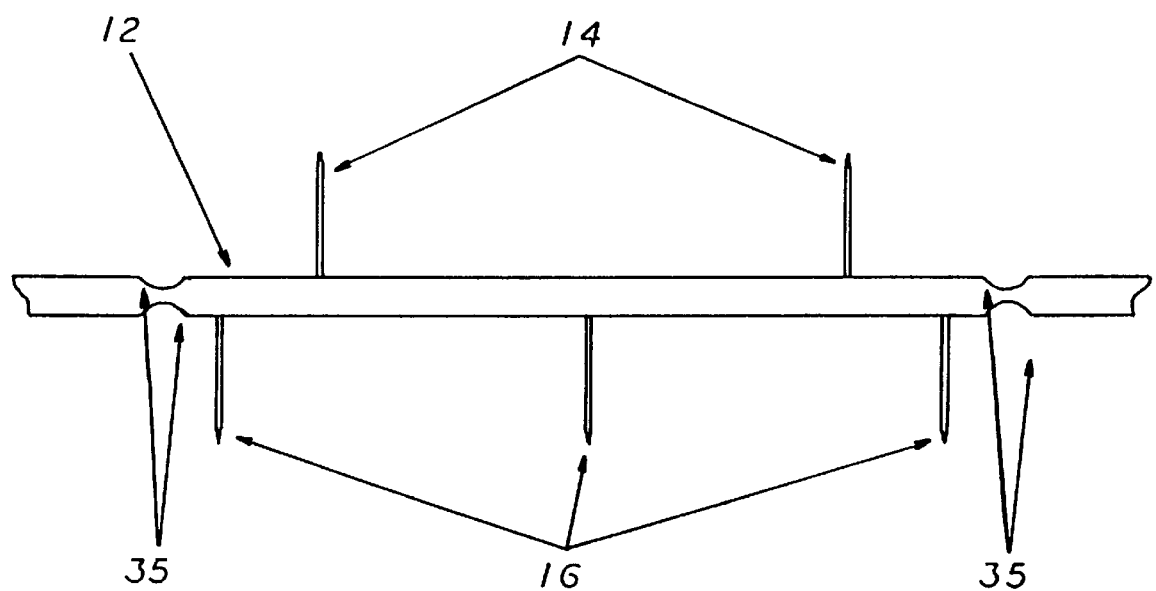
FIG. 7 is an exploded front elevation view of the cutting bar portion of the present invention detailing an alternative embodiment of the guide bar runners.

FIG. 6 shows an alternative embodiment of the Uniform Bar and Cake Cutter 10. This embodiment shows a modified front guide block bar 25. The modified guide block bar 25 is formed using less material. FIGS. 6 and 7 further depict modified guide bar runners 35. These modified guide bar runners 35 are hemispherically formed into both the upper and lower surfaces of the cutting blade bar 12 in a position corresponding with the guide bars 18.

Although the present invention has been described in considerable detail with reference to certain preferred versions thereof, other versions are possible. Therefore, the spirit and scope of the appended claims should not be limited to the description of the preferred versions contained herein.

What is claimed is:

1. A baker's cutting apparatus for uniformly dividing pans or sheets of bars or cakes said apparatus comprising:

an elongated guide means removably placed in a fixed position relative to said pan or sheets of bars;

an elongated blade holding member having a first and a second end;

a plurality of spaced cutting blades extending perpendicularly from said blade holding means and parallel to a longitudinal axis of said guide means;

a means of removably and slidably attaching said blade holding means to said guide means in a position perpendicular to said elongated guide means such that said blade holding means may be moved relative to said elongated guide means.

2. A Baker's cutting apparatus as in claim 1 wherein said guide means comprises at least two parallel elongated shafts, said shafts being centered between a front guide bar block and a rear guide bar block.

3. A baker's cutting apparatus as in claim 2 wherein said front guide block further comprises a recessed portion for holding said pans or sheets.

4. A baker's cutting apparatus as in claim 3 wherein said attaching means comprises a pair of recessed guide bar runners formed into both of said first and second sides of said elongated bar so as to align with said elongated shafts.

5. A baker's cutting apparatus as in claim 3 wherein said attaching means comprises a pair of U shaped clips fixedly attached to both of said first and second sides of said elongated bar so as to align with said elongated shafts.

6. A uniform bar and cake cutter apparatus comprising:

an elongated bar having a first and second side and ends;

a plurality of spaced cutting blades extending perpendicularly from said elongated bar with said cutting blades extending at a first and second spacing from said first and second sides of said elongated bar;

at least two parallel elongated shafts, said shafts being centered between a front guide bar block and a rear guide bar block; and a means of removably and slidably attaching said blade holding means to at least one of said parallel elongated shafts.

7. A uniform bar and cake cutter as in claim 6 wherein said front guide block further comprises a recessed portion for holding said pans or sheets.

8. A uniform bar and cake cutter as in claim 7 wherein said attaching means comprises a pair of recessed guide bar runners formed into both of said first and second sides of said elongated bar so as to align with said elongated shafts.

9. A uniform bar and cake cutter apparatus as in claim 7 wherein said attaching means comprises a pair of U shaped clips fixedly attached to both of said first and second sides of said elongated bar so as to align with said elongated shafts.

\* \* \* \* \*